Dec. 7, 1965 G. C. CAVALIER 3,221,367

PHONOGRAPH RECORD PRESSING MACHINES

Filed Oct. 19, 1962 2 Sheets-Sheet 1

INVENTOR.
GERARD C. CAVALIER

BY Eugene S. Lovette
ATTORNEY

PHONOGRAPH RECORD PRESSING MACHINES

Filed Oct. 19, 1962 2 Sheets-Sheet 2

INVENTOR.
GERARD C. CAVALIER
BY
Eugene S. Lovette
ATTORNEY

United States Patent Office 3,221,367
Patented Dec. 7, 1965

3,221,367
PHONOGRAPH RECORD PRESSING MACHINES

Gerard C. Cavalier, 16 Forestdale Drive, Huntington, N.Y.

Filed Oct. 19, 1962, Ser. No. 231,655
6 Claims. (Cl. 18—5.3)

The present invention relates to improvements in phonograph record pressing machines, and more particularly to improvements that can be made in existing compression molding machines with a view to produce records of high quality and devoid of some of the drawbacks frequently encountered in this process.

Although injection molding of phonograph records has been practiced in this country for quite a few years, this process did not find wide-spread use because of certain difficulties which could not as of yet be entirely avoided. These are the need for separate labelling machines, and the problems inherent in the injection molding process proper, for example, difficulty of adequately filling the record grooves, necessity for controlling mold shrinkage, and warping of some records after molding.

For these reasons, most manufacturers still favor the somewhat older compression molding process, e.g., by using vinyl copolymer or other suitable plastic materials. With this process, the labels can be attached simultaneously to both sides during the pressing proper, and most of the process variables (e.g. pressure, temperature) are easier to control.

There is, however, one major drawback which causes numerous defects and which has to be strictly controlled if serious economic losses should be avoided during mass production. This is the difficulty of producing records with center holes which comply with strict tolerances. It has to be borne in mind, in this connection, that any inaccuracy of the center hole, or slight oversize thereof, may render the phonograph record eccentric during playback with respect to the turntable. It is well known that this is the cause of serious distortions of reproduction, some of which are called wow and flutter. In its simplest form, the distortions manifest themselves in irregular and unpleasant sound reproduction.

Any mechanical default of the phonograph record center hole, e.g. unevenness, chipped edge, or axial burr, is liable to produce and/or increase such tracking and reproducing troubles. It has, therefore, been the endeavor of those engaged in the record business to produce and market records having center holes responding to the narrowest possible tolerances. The present invention represents a major improvement in this respect.

It is the object of the present invention to improve the pressing technique of phonograph records, the physical dimensions and tolerances thereof, and to avoid the drawbacks caused by irregular, oversize or faulty center holes.

It is another object of the invention to provide a novel apparatus which is adapted to produce impeccable records with the simplest means and without costly additional equipment.

It is a further object to provide an improvement for existing pressing machines, adaptable without exorbitant changes, additions or new acquisitions, and capable of improving the quality of the records produced therewith.

According to the major feature of the invention, one of the mold halves, preferably the reciprocable lower half, is provided with a central metal disc having a carefully machined central bore, and therein a vertically reciprocable centering pin. By hydraulic, mechanical or other suitable means, the centering pin is made to extend from the respective mold half toward the mating other half, while the customary pressing process is performed.

When the reciprocable mold portion is close enough to the other mold portion so that the pin abuts against it, the latter is urged against said other portion with a force just slightly weaker than that of the press itself. The pin will thus recede into the reciprocable mold half while the mold closes, providing an almost ideal seal at the center hole of the pressed phonograph record.

It is another important feature of the invention that all surfaces of the centering pin and the metal disc surrounding it are very carefully machined so that practically no leakage presents itself at or around the disc exit port from where the pin emerges. As will be explained hereunder in more detail, tens of thousands of phonograph records may be pressed without need of replacing either the disc or the pin. It will be understood that the mating mold half is also provided with a carefully machined metal disc against which the reciprocable centering pin abuts.

According to another feature of the invention, the metal disc of the mating mold half may be given recess in which the forward end of the centering pin may slightly enter for an even better contact, avoiding thus any plastic substance to spill out therebetween.

Another novel and useful feature of the invention resides in the provision of interengaging profiled portions in a lower portion of the centering pin and in a depending stud of the metal disc through which the pin passes. According to a preferred embodiment, the stud may have a square-shaped recess while the end of the pin is given a mating square-shaped head. This arrangement allows the assemblage of the inventive elements into existing pressing machines where peculiar structural arrangements do not allow these elements to be mounted from within any of the mold halves.

The novel method of pressing flawless phonograph records is characterized in that the above-described centering pin is first made to project from within one of the mold halves, then the plastic material is spread in the usual way, lower and upper circular labels are applied, and then the mold halves are made to approach while the pin is kept in constant tight abutment with the other mold half. When the phonograph record is cured, the lower mold half is lowered again while the pin is forced out, as before. The record may be lifted off the centering pin and the lower mold half.

Further objects and advantages will become apparent from the following description of the invention taken in conjunction with the figures, in which.

Figures 1, 2, 3, 4:
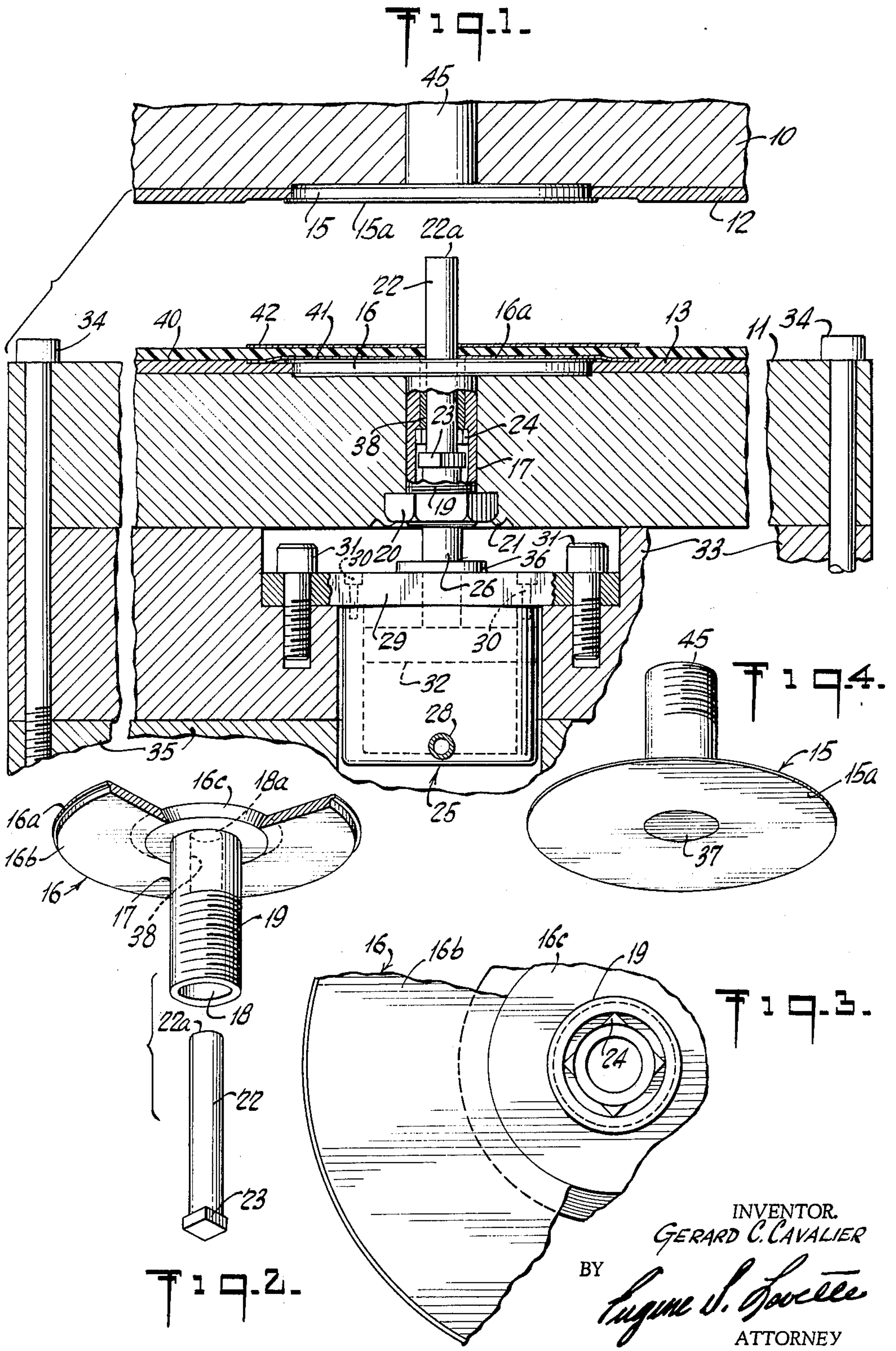
FIG. 1 represents a somewhat schematic sectional view of a phonograph record pressing machine, with two mold halves shown in a separated position, and embodying the improvement according to the present invention.
FIG. 2 is a perspective view of the centering pin with the associated metal disc having a central bore and a lower stud, the elements being detached from the machine shown in FIG. 1.
FIG. 3 is a plane view of the metal disc shown in FIG. 2, as viewed from its stud end.
FIG. 4 is a perspective view of a second metal disc, without bore or recess, adapted to be engaged by the centering pin of FIG. 2.

Referring now to the drawings, and to FIG. 1 in particular, numerals 10 and 11 indicate respective upper and lower halves of the pressing machine mold. Each mold 10, 11 carries a circular stamper 12, 13, respectively, having grooves corresponding to those to be formed in the phonograph record to be pressed on the machine. The upper and stationary mold half 10 has a flat hard solid metal center disc 15 firmly mounted therein. A lower flat hard metal center disc 16 is provided in the lower and reciprocable mold half 11. Disc 16 has an elongated depending stud 17 and is also provided with a hollow through bore 18 and an external thread 19. The central portion of disc 16 and stud 17 are preferably made from one piece, and are seated in a central recess of mold 11. The disc-and-stud assembly 16, 17 are held in position by means of a nut 20 engaging the outer threaded portion 19 of stud 17. Nut 20 is secured to mold 11 by peening over the latter as depicted at 21.

Figure 5:
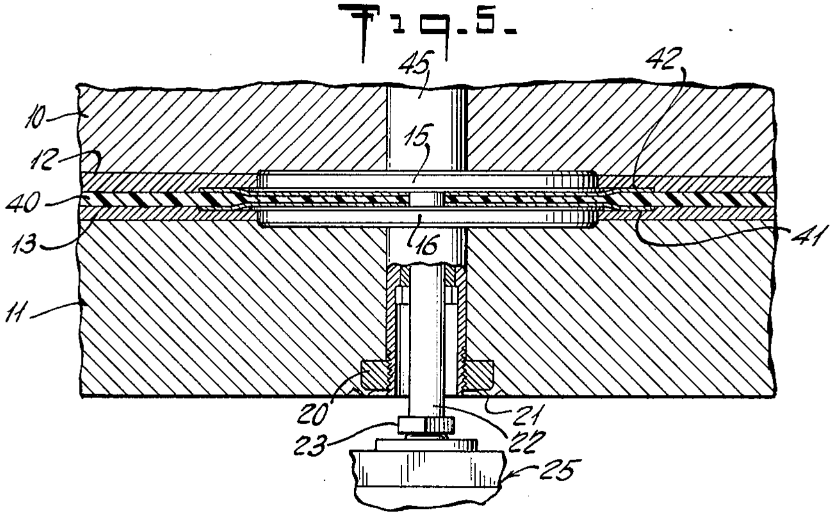
FIG. 5 is a sectional view similar to that of FIG. 1 but showing the mold halves in a completely closed position.
Figure 6:
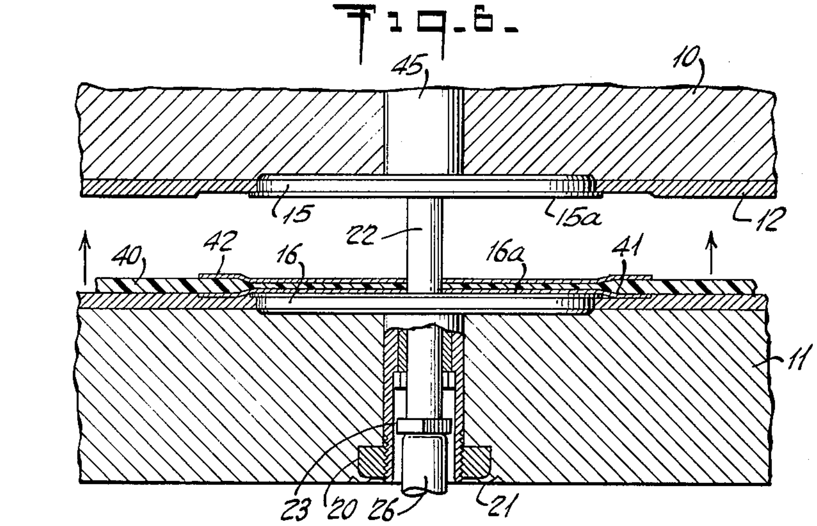
FIG. 6 is another sectional view similar to FIGS. 1 and 5 but showing the mold halves halfway separated after a phonograph record has been pressed therebetween.

Stud 17 has an axial hollow bore 18 designed to receive an axial center pin 22. The lower end of pin 22 is square-shaped at 23 or otherwise formed to key in an internal seat 24 of bore 18. FIGS. 1, 5 and 6 show head 23 contained in the enlarged diameter portion of bore 18 below seat 24. Seat 24 is square-shaped to key with pinhead 23. The smaller diameter portion of bore 18 above seat 24 and the cylindrical outer diameter of pin 22 are carefully machined to exact tolerances to permit reciprocating up and down motion of pin 22 in bore 18 with a minimum of clearance space therebetween to provide an almost ideal seal against the entry of plastic material in said space during record molding. Similarly, the top edge of bore 18 at 18*a* (see FIG. 2) in the plane of disc 16 also is machined to exact tolerances so as to receive and let pass the upper endwise end 22*a* (FIG. 1) of pin 22. Pin 22 is adapted to protrude through disc 16 when molds 10, 11 are separated, see FIG. 1. In other words, pin 22 extends up through disc 16 and into the space between movable lower mold 11 and stationary upper mold 10 as shown in FIG. 1.

Pin 22 is acted upon, as a matter of example, by a hydraulic mechanism depicted as 25. Hydraulic means 25 has a vertical plunger 26 which extends into operative contact with the lower end 23 of pin 22. Hydraulic means 25 includes a single action cylinder provided with a hydraulic fluid inlet 28 coupled to and fed by the main hydraulic system of the press (not shown), whereby hydraulic means 25 acts as a hydraulic spring. Hydraulic means 25 is provided with an upper flange 29 secured by suitable means, such as cap screws 30, to the cylinder housing of means 25, which housing contains the piston 32 of plunger 26. Hydraulic means 25 is mounted in a suitably shaped recess in a flat spacer member 33 and bolted thereto by bolts 31. Spacer 33 is mounted on a press bolster plate 35 which in turn rests on the press body. The foregoing assembly is held together by conventional means, such as bolts passing through mold 11, spacer 33 and bolster 35 and secured to the press body. Spacer 33 is added to the assembly to accomplish the addition of hydraulic means 25 thereto as depicted schematically herein. A cylindrical projection 36 on flange 29 allows plunger to extend therethrough and serves as a bearing support for plunger 26.

The phonograph record press equipped with the improved apparatus according to the present invention operates as follows: Soft uncured plastic material 40 is placed on lower mold stamper 13. In the practice of the instant invention, the feed of record material 40 is the same as that currently observed in prior art, hence, it is understood that the proper amount of material 40 in coil form is deposited on stamper 13. Prior thereto, a circular paper label 41 is inserted over pin 22 and positioned on the upper surface of disc 16. It should be noted that, for the sake of simplicity, the same numeral 40 has been used throughout the figures for denoting the plastic material, whether in soft, uncured or hard, pressed and cured condition. Material 40 is to be considered representative of any suitable plastic substance or composition, e.g. vinyl copolymer, polystyrene, or any composition adapted for pressing phonograph records therefrom.

A second circular paper label 42 is placed over pin 22 on the top side of the coiled material 40. Both paper labels 41, 42 preferably have center holes prepunched to exact measurements (substantially identical with the outer diameter of pin 22). Each of the discs 15, 16 may have confronting narrow flanges 15*a*, 16*a* as shown in FIGS. 1 and 6. The diameter of flanges 15*a*, 16*a* are generally about one inch less than the diameter of labels 41, 42. Flanges 15*a*, 16*a* overlap slightly beyond the contiguous edges of the respective stampers 12, 13 so as to compensate somewhat for the thickness of the paper labels.

When lower mold 11 is moved upward by suitable actuating force provided by the main system hydraulic means (not shown), plastic 40 is compressed and flows between stampers 12, 13 to form the record. The plastic 40 also flows between opposing discs 15, 16 and substantially fills the gap between the two labels 41, 42. It should be noted that molds 10, 11 are never brought together to effect surface-to-surface contact, but remain apart equal to the thickness of the phonograph record formed thereby. To this extent, the invention follows the practice of prior art.

When the upper end 22*a* of pin 22 abuts endwise against disc 15 as mold 11 is raised, see FIG. 6, plunger 26 is forced back into hydraulic means 25 by the bottom of pin 22 so that eventually the upper pin end 22 extends above lower disc 16 by the thickness of the formed record. It will be understood by those skilled in the art that the opposing forces of the main hydraulic or other actuating mechanism of the phonograph record press and of the hydraulic means 25 are maintained at a force ratio so that continuous and tight endwise contact is always present between pin end 22*a* and disc 15 while said discs approach one another, i.e. as mold halves 12, 13 come together. For example, the main press hydraulic and hydraulic means 25 are both coupled to a constant delivery pump applying a hydraulic pressure of 1800 pounds per square inch. It will be understood that this pressure is always applied to cylinder plunger 26. Since the area through which the main press pressure is applied is much larger, the main press is able to overcome the smaller force acting on pin 22 from the moment the top of pin 22*a* abuts endwise against disc 15. As shown in FIG. 3, the center portion 37 of disc 15 may be made of an insert of extremely hard material to withstand the repeated abutments of pin 22 during the reciprocal motion of the press. It should be noted that disc 15 may have an elongated upper portion 45, as shown in FIG. 4, which may be provided with an external thread or other means for fastening the same to upper mold 10 in a manner known.

Pin 22 as well as discs 15, 16 are very accurately machined, as has been mentioned before, so that pin upper end 22*a* makes and maintains a perfect end abutment against the confronting face of disc 15. The small diameter portion of disc bore 18 and its upper edge 18*a* and pin 22 proper are machined accurately to prevent any plastic material 40 squeezing between said hole 18 and pin 22 while molds 10, 11 are pressed together. If any material 40 gets through, it will deform the center hole of the phonograph record and will create an irregularity or axial burr which causes rejection of the record, otherwise the record will give a poor acoustic performance and will be considered unfit for marketing. To achieve high accuracy of fitting between pin 22 and stud bore 18 and at the same time to provide long life wear, a bushing 38 of suitable hardened material may be used as a liner in bore 18.

Pin 22, its end 22*a* and disc holes 18 and its edge 18*a* are made and assembled to maintain perfect vertical relationship. Furthermore, pin end 22*a* is also machined accurately with respect to face of disc 15 to prevent any plastic material oozing therebetween, to avoid hole irregularity on this side of the record too, and to avoid burrs or other deformations.

After the record is pressed and cured, the lower mold half 11 is lowered again. With a continuous upward force action upon hydraulic means 25 to urge plunger 26 and thus pin 22 upward, these reciprocating elements are "spring hydrauliced" to return to their "up" position, as shown in FIG. 1, as molds 10, 11 separate. The record may then be lifted off the mold 11.

The centering device according to the present invention is made to permit attachment to existing phonograph record pressing machines. The peculiar structure of mold 11 prevents the disc-stud assembly 16, 17 and pin 22 to be mounted thereto except from top of mold 11. Hence, in order to screw stud 17 into nut 20, pin 22 and said stud 17 have mating portions 23 and 24, respectively, adapted to be keyed. The steps of assembly are as follows. Prior to inserting the disc-stud assembly 16, 17 into mold 11, pin 22 is introduced into stud 17 from below and pulled up through the top bore edge **18*a* of disc 16 so that pinhead 23 keys into seat 24. The upper end of pin 22 projects out from and above the plane of the upper face of disc 16, whereupon this end of pin 22 may be grasped by the fingers of the operator for the purpose of lowering stud 17, threaded end first, into the mold recess so that stud thread 19 may engage the internal thread of nut 20. While disc-stud 16, 17 is being so lowered, pinhead 23 remains keyed in seat 24, whereby the disc and stud assembly 16, 17 also can be turned about the vertical axis by means of pin 22 so that the external thread of stud 17 threads into nut 20. During normal operation of forming and pressing records, the square-shaped key portions 23, 24 do not register any more. For replacement purposes, the pin may be manually raised until mating portions 23, 24 register, whereupon the disc-stud assembly can be removed from the lower mold. The under face of disc 16 is of substantial area. Should moisture creep between this surface of the disc and the contiguous surface of the mold recess in which the disc is seated, this may cause the two units to bind whereby it becomes extremely difficult to remove disc-stud assembly 16, 17 without snapping pin 22. Accordingly, disc 16 may be made in two parts; an outer ring 16*b* and its inner portion 16*c*. The contiguous edge surfaces of coplanar units 16*b*, 16*c* are inclined and upon assembly they mate perfectly to provide a flat and smooth disc 16 which for all practical purposes is an integral body. However, upon removal of the disc-stud assembly 16, 17; only the inner central portion 16*c* and the stud 17 attached thereto is removed wherein the outer ring 16*b* remains seated in mold 11**.

Figure 7:
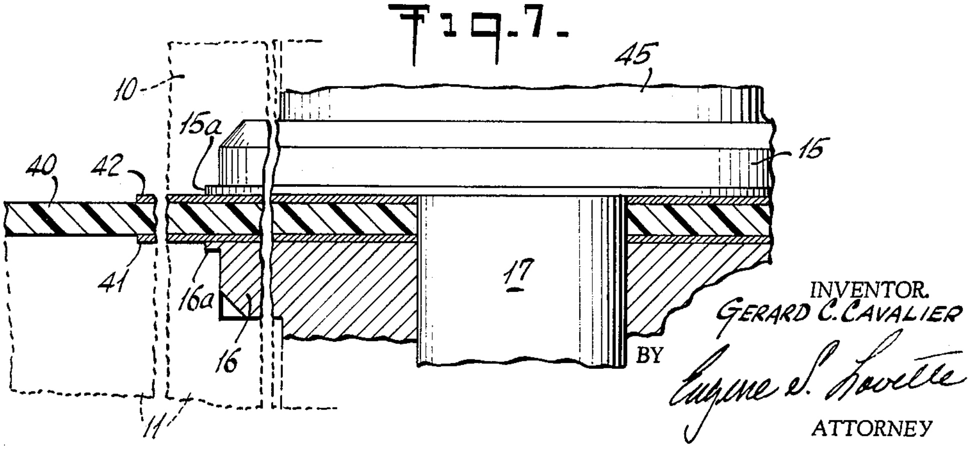
FIG. 7 is an enlarged partial view of FIG. 5 showing the elements of FIGS. 2–4 in their operative positions.

The hydraulic means 25 is shown attached to the lower mold half 11. It will be understood, of course, that this is a matter of design only and said means can also be supported by other portions of the press, e.g. a frame portion, a separate standard or a support. The means for operating, controlling and otherwise correlating said mechanism with the remaining elements of the record press may be of conventional design, as long as the "spring force" acting upon pin 22 is counteracted by the force applied to the moving mold half while reciprocated with respect to the stationary half. In other words, hydraulic 25 is always applying upward "spring force" to pin 22. When molds 10, 11 are being brought together, the main press hydraulic causing upward travel of mold 11 is greater in force so that once pin end **22*a* abuts endwise against disc 15, pin 22 is caused to retract into stud 17, see FIG. 6. However, the still active hydraulic 25 continues to hold pin end 22*a* in endwise abutment against disc 15 while pin 22 is retracting. The endwise abutment of 22*a* against disc 15 also subsists while the molds are together as the record is being stamped and cured, see FIGS. 5 and 7. Then when molds 10, 11 are being separated by the main hydraulic (FIG. 6 reverse the arrows), pin 22 is reciprocated upwardly by hydraulic 25. When the press separation is greater than maximum travel imparted by hydraulic 25, pin end 22*a* separates from disc 15, as shown in FIG. 1. The maximum upward travel of pin 22 is controlled by regulation of hydraulic 25, and at its peak up position, pinhead 23 is still below seat 24**.

Thus, for instance, it is considered within the scope of the present invention to provide the improvement in a press or similar machine where the lower mold half is stationary while the upper one is reciprocable, or even in injection or other kinds of presses where two mating mold portions are used.

It is also within the scope of the invention to provide registering shapes of the stud recess and the pin end other than square shaped, or to reverse the mating male and female members so that, for example, the lower pinhead is given a recessed portion with which a protruding portion of the inner stud structure may engage.

It is intended that all matter contained in the above description or shown in the accompanying drawing shall be interpreted as illustrative and not in a limiting sense.

What is claimed is:

1. A compression press for forming a phonograph record comprising, first and second mold halves, a disc-stud assembly mounted in the first mold and having a relatively flat planar disc and a stud depending therefrom, said disc-stud assembly having a bore through the stud thereof, said stud having a threaded outer surface for detachably securing same with threaded means in said first mold, the axis of said bore being substantially perpendicular to the plane of said disc, a second flat disc confronting said first disc and secured to the second mold, a centering pin mounted in said stud bore for reciprocal travel therein and having an outer end projecting between said discs for endwise abutment against said second disc, hydraulic means for providing a biasing force on said pin in a direction to effect such endwise abutment, and means for closing said mold press for forming a record therebetween wherein the outer projecting end of said centering pin is caused to abut said second disc and then retract into said stud by reason of the closing force of said press overriding said pin biasing force, said centering pin returning to its projecting position under its biasing force upon opening of said press, said pin and stud bore being characterized to provide a seal against plastic flow therebetween during record molding, said pin outer end and said second disc also providing a seal against plastic flow therebetween during record molding, said stud bore having a profile portion, said pin having means for providing a captive keying engagement with said bore profile portion upon axial lifting of said pin, wherein said stud assembly is rotatable by said pin for threaded engagement and disengagement with respect to said threaded means.

2. Apparatus as defined in claim 1 wherein, said first disc is formed of an outer flat ring member designed to seat concentrically in coplanar fashion with respect to the inner central flat portion of said disc, the contiguous surfaces of said ring and inner central portion being inclined wherein insertion or removal of said stud assembly involves only removal of the inner central portion of said disc while the outer ring portion remains seated in said first mold.

3. In a compression phonograph record press, the combination comprising, a pair of mold halves each having record stamper means attached thereto for pressing grooves into plastic records, a disc mounted over the central portion of each stamper, said discs being in opposed confronting relationship, each disc having a surface substantially flush with the groove-forming surface of its correlated stamper, a centering pin reciprocally moveable within a said first of discs, hydraulic means for biasing said centering pin toward and into flush abutting contact with the second disc, whereby said pin protrudes between said discs to prevent deformation of the plastic material in the region of said pin when the press is forming the record center hole, means for detachably securing said first disc to said mold half, said pin having means for captive-keyed register with complementary shaped means in said first disc for effecting rotating turning of said first disc by turning said pin for detaching and securing said first disc with respect to its mold half to allow replacement of a centering pin and also to permit release of the stamper from said last-mentioned mold half.

4. A press as defined in claim 3 wherein said centering pin includes a profiled portion for keying with the complementary shaped means of said first disc.

5. In a phonograph record press, the combination comprising, a pair of opposite mold halves, coacting and confronting stamper means attached to said mold halves for pressing records from plastic material, means for selectively closing said mold halves during pressing operation, a centrally arranged disc assembly secured to one of said mold halves, centering pin reciprocally moveable within said disc assembly for travel toward and away from the opposite mold half, hydraulic means for continuously biasing said centering pin toward said opposite mold half, the force of said biasing means being exceeded by the force of said closing means during pressing operation, whereby said centering pin protrudes between said molds to provide a mandrel center post for the pressed record and prevents plastic material deforming in the region of the record center hole, means for detachably securing said disc assembly to said one mold half, and means in said disc assembly for selective keyed register with complementary means on said centering pin, said last mentioned pin means being captively keyed in said assembly means upon lifting of said pin to provide rotatable engagement therebetween, whereby said disc assembly is selectively secured and detached from said one mold half to allow exchange of a centering pin and also to permit release of the stamper from said one mold half without disassembly of said one mold half from said press.

6. In a press as defined in claim 5 further including, a second centrally arranged disc assembly secured to the second of said mold halves for operative contact with the butt end of said centering pin when the press is in closed status and when the press is undergoing closing and opening status.

References Cited by the Examiner

UNITED STATES PATENTS

| | | | |
|---|---|---|---|
| 1,370,185 | 3/1921 | Capps | 18—5.3 |
| 1,436,941 | 11/1922 | Burkard | 18—5.3 |
| 2,106,623 | 1/1938 | Proctor et al. | 264—107 |
| 2,839,306 | 6/1958 | Bayless | 18—5.3 X |
| 2,998,622 | 9/1961 | Renoux | 18—5.3 |
| 3,019,482 | 2/1962 | Houten | 18—5.3 |
| 3,060,516 | 10/1962 | Houten | 264—107 |

J. SPENCER OVERHOLSER, *Primary Examiner.*

ALEXANDER H. BRODMERKEL, WILLIAM J. STEPHENSON, *Examiners.*